June 9, 1942.  H. A. WEILER  2,285,637
BUTTER SERVER
Filed Dec. 13, 1940  2 Sheets-Sheet 1

INVENTOR.
H. A. Weiler
BY
Webster & Webster
ATTORNEYS

June 9, 1942.  H. A. WEILER  2,285,637
BUTTER SERVER
Filed Dec. 13, 1940  2 Sheets-Sheet 2

INVENTOR.
H. A. Weiler
BY
ATTORNEY.

Patented June 9, 1942

2,285,637

UNITED STATES PATENT OFFICE 2,285,637

BUTTER SERVER

Henry A. Weiler, Georgetown, Calif.

Application December 13, 1940, Serial No. 370,041

6 Claims. (Cl. 31—21)

This invention relates generally to an improvement in food dispensers, and in particular the invention is directed to, and it is my principal object to provide, a manually actuated device operative to cut a square of butter for individual use from a conventional cube, and to deliver the cut square onto a plate without the square being touched by hand.

Another object of the invention is to provide a butter cutter and server, as above, which is designed mainly for use in restaurants and other public eating establishments, although the device can be used to advantage as a domestic or household appliance.

A further object is to provide a butter cutter and server which is so arranged that the device can be actuated by the palm of the hand which holds the butter plate beneath the delivery mechanism for the square of butter.

It is also the purpose of the invention to provide a butter cutter and server which is sanitary; refrigerates the cube of butter before cutting; functions smoothly and effectively to cut a square of butter of predetermined thickness; saves time, as it speeds up the serving of butter; and is so constructed that it can be taken apart readily for cleaning and sterilization.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
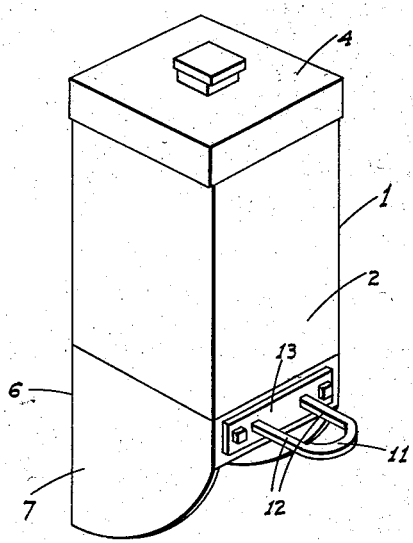
Figure 1 is a perspective view of the device.
Figure 2:
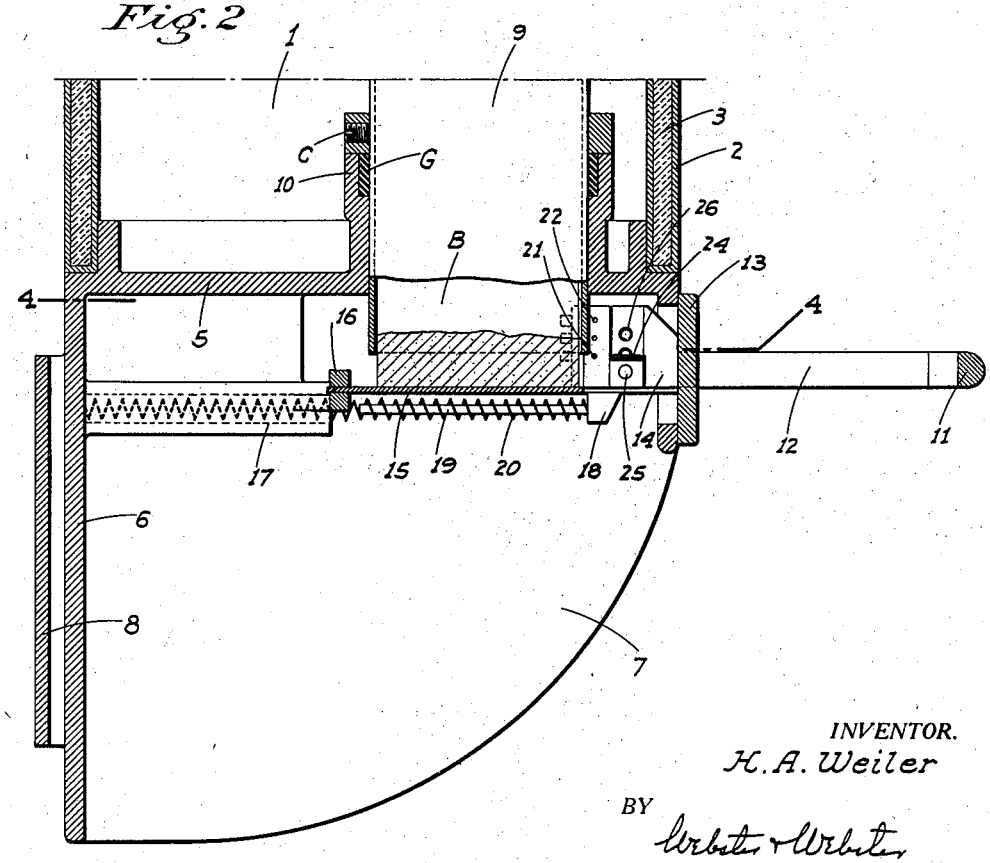
Figure 2 is an enlarged, fragmentary side section, showing the cutting and delivery mechanism in inoperative or retracted position.

Referring now more particularly to the characters of reference on the drawings, the device comprises an upstanding refrigerating chamber 1 which is rectangular in cross section and formed with double walls 2 which are insulated as at 3. The initially open upper end of chamber 1 is normally closed by means of a removable lid 4. The chamber is fitted with a bottom 5 and a base depends therefrom; such base including a back plate 6 and side skirts 7 and being open at the front and bottom.

While the device may be supported or mounted in any suitable manner, I here show a socket 8 on the rear face of back plate 6 and which socket is adapted to engage over a wall mounted tongue (not shown).

A vertically disposed tube 9 is mounted in chamber 1 adjacent the front wall and centrally between the side walls; such tube being rectangular in cross section and of a size to slidably receive a conventional "cube" of butter B endwise therein. The lower end portion of tube 9 engages in and projects through a symmetrical sleeve 10 formed with and upstanding from the bottom 5 of chamber 1, the lower end of the tube being disposed in a horizontal plane a predetermined distance below bottom 5.

The tube is normally secured against upward vertical movement by a collar and set screw unit C, and this set screw can be retracted to permit of vertical adjustment of the tube. A gasket or bushing G, preferably of rubber, is seated in an internal groove in sleeve 10, and cooperates with tube 9 in sealing relation. The refrigerating medium, such as water ice, Dry Ice, or the expansion coil of a mechanical refrigerator, is placed in chamber 1 in surrounding relation to tube 9.

The butter cutting and serving mechanism comprises a horizontally disposed U-shaped handle 11 whose parallel legs 12 slidably project through a guide plate 13 removably mounted immediately below bottom 5 and at the front of the base which is open behind said plate. The handle 11 is normally retracted from plate 13 to the limit of its travel; enlarged heads 14 on the inner ends of legs 12 preventing escape of said legs from plate 13 and against which plate said heads normally engage. The heads 14, as well as legs 12, are spaced apart to such extent that they are disposed in vertical planes outwardly of the opposite sides of the depending lower end portion of tube 9.

A horizontal plate 15 is fixed at one end in connection with heads 14 and extends rearwardly beneath the lower end of tube 9; this plate supporting the lower end of the cube of butter B in said tube. The rear end of the plate 15 normally is disposed at and slidably engages in a transverse, slotted guide bar 16 mounted between the ends of a pair of transversely spaced, elongated sockets 17 which extend horizontally toward the front from back plate 6. Ears 18 depend from heads 14, and a rigid, horizontal pin 19 projects rearwardly from each ear as the retaining means for long compression springs 20 disposed in sockets 17, surrounding the pins and engaging the ears, as shown.

A taut cutter wire 21 extends horizontally between the heads 14 in a plane only slightly below the lower end of tube 9; the wire extending through alined holes 22 in said heads and being held in place by set screws 23. There is a vertical row of spaced holes 22 in each head so that the wire can be mounted in different horizontal planes above plate 15.

An upwardly facing, flat strip 24 is mounted horizontally between heads 14 toward the front of the device relative to wire 21; the wire and strip being in the same horizontal plane. The strip is attached to the heads by bolts 25 which engage through alined holes 26 of vertical rows thereof, and which rows are provided so that the strip can be adjusted vertically the same as wire 21.

In use the above described butter cutter and server functions in the following manner:

A person, such as a waitress, takes a plate in one hand and projects the latter between the side skirts 7 from the front of the device and simultaneously engages the handle 11 with the butt or palm of the same hand, pressing such handle inwardly or advancing the same as far as possible.

Figure 3:
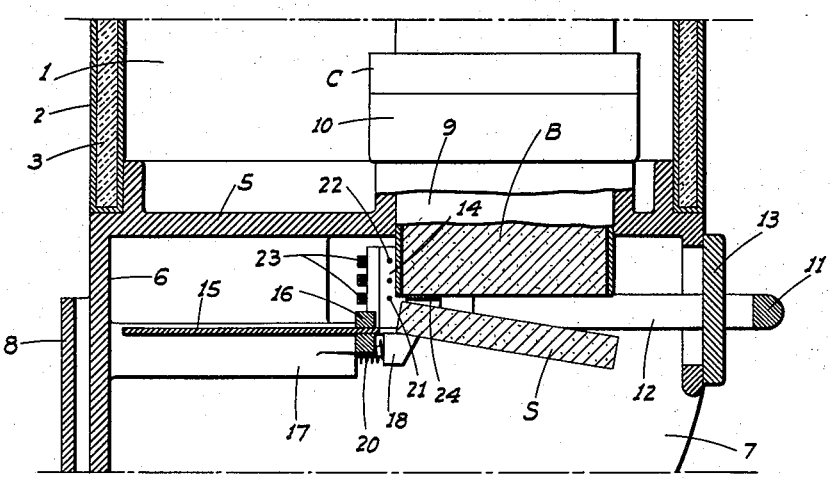
Figure 3 is a similar view but with the cutting and delivery mechanism in the position to which it is advanced to cut and deliver a square of butter.
Figure 4:
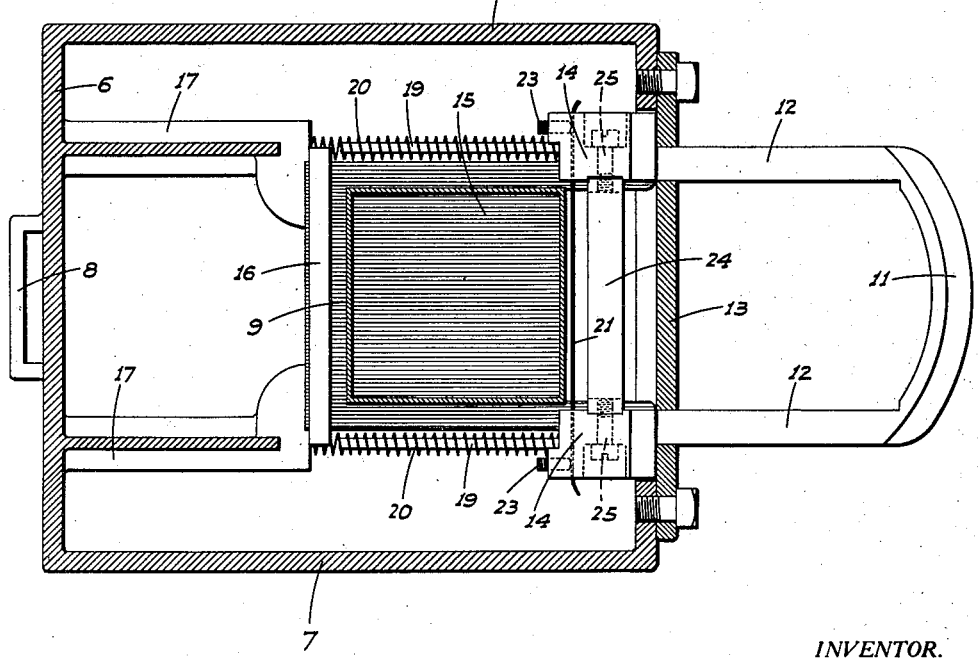
Figure 4 is a section on line 4—4 of Fig. 2.

With such advancing movement the wire 21 cuts through the lower end of the cube of butter B which is projecting below the lower end of tube 9 and resting on plate 15. When the handle has been advanced as far as possible, the wire 21 has cut entirely through the cube of butter and is disposed in a vertical plane rearwardly of the tube 9, as clearly shown in Fig. 3. At the same time the plate 15 has slid rearwardly through guide bar 16 until such plate is clear of the butter, whereupon the square S (see Fig. 3) which has been cut from the cube by the wire drops onto the plate. With the several parts in the advanced position, as described above, the strip 24 has moved to a position beneath the cube of butter remaining in the tube and prevents downward movement thereof until the handle is released and the plate 15 returns to its normal position beneath the tube and on which the cube of butter normally rests at its lower end. The compression springs 20 function, after the handle has been advanced and a square of butter cut and served, to return or retract the cutting mechanism to its normal position.

If it is desired to cut and serve a square of butter of greater thickness, the wire 21, as well as strip 24, are raised or adjusted vertically relative to plate 15 whereby the wire will cut through the butter a greater distance above said plate. When the wire 21 and strip 24 are so adjusted, it is also necessary to raise tube 9 a corresponding distance, which is accomplished by unloosening set screw C.

By reason of the fact that guide plate 13 is removably mounted, such plate, together with handle 11, plate 15 and the cutting wire and other related parts, may be withdrawn as a unit from the device for cleansing and sterilization, as may the tube 9.

For restaurant use or the like, my improved butter cutter and server may be made in multiple and side by side relation.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A butter server comprising a horizontal supporting member, a vertical tube projecting through said member and secured thereto, said tube being formed to slidably receive a cube of butter lengthwise, a U shaped handle disposed horizontally in a plane adjacent the lower end of the tube and with the initially open end of said handle facing the tube, means mounting said handle for reciprocating movement, an enlarged head on each of the legs of the handle at their free ends, a horizontal plate connecting said heads and normally extending under the tube in spaced relation thereto and on which the lower end of the cube rests, and a horizontal cutting element connected between said heads in a plane above the plate but below the plane of the lower end of the tube; the plate sliding clear of the cube and the cutting element cutting entirely through the exposed portion of the cube upon reciprocating movement of the handle in one direction.

2. A butter server comprising a housing, an upstanding tube on the housing to slidably receive a cube of butter, a horizontal slide assembly disposed beneath the tube and including an actuating handle outside the housing and a cutting element within the housing and means mounting the assembly on the housing for horizontal reciprocating movement; said means including a member removably mounted on the housing and whose removal allows of removal of the assembly as a unit from the housing.

3. A butter server comprising a housing, an upstanding tube on the housing to slidably receive a cube of butter, a horizontal slide assembly disposed beneath the tube and including a butter support, a cutting element, and a handle having transversely spaced legs; the housing including a front wall having an opening in the horizontal plane of and of sufficient size to receive the assembly therethrough, a plate larger than said wall opening having openings through which the legs project with a sliding fit, and means removably mounting the plate on said housing wall.

4. A butter server comprising a housing, an upstanding tube on the housing to slidably receive a cube of butter, a horizontal slide assembly disposed beneath the tube and including a butter supporting plate, a cutting element and a handle having a straight horizontal leg; and means mounting the assembly for horizontal reciprocating movement in a direction lengthwise of the leg; said leg including a transversely extending guide fixed in the housing and through which the plate removably slides from its inner end and a vertical plate having an opening through which the leg slidably projects removably supported on the housing, the housing being arranged relative to the assembly and to said last named plate so that upon removal of the plate, the assembly may be withdrawn as a unit from the housing.

5. A butter server comprising a housing, an upstanding tube on the housing to slidably receive a cube of butter, a horizontal slide assembly disposed beneath the tube and including a butter supporting plate, a cutting element and a handle having a straight horizontal leg; and means mounting the assembly for horizontal reciprocating movement in a direction lengthwise of the leg; said leg including a transversely extending guide fixed in the housing and through which the plate removably slides from its inner end, a member on the housing having an opening through which the leg slidably projects, a compression spring extending lengthwise of the direction of movement of the assembly from adjacent the plane of the front edge of the plate to adjacent the back of the housing, a socket in the housing surrounding the back portion of the spring, an abutment on the assembly for the front end of the spring and a rod projecting from said abutment through the adjacent portion of the spring.

6. A butter cutter comprising a vertical tube, a horizontal slide assembly mounted below the tube and including a butter supporting plate disposed at a fixed level and a cutting element above said plate and adapted to cooperate with and traverse the lower edge of the tube upon sliding movement of the assembly, means mounting the element on the assembly for vertical adjustment relative to the plate and means mounting the tube for corresponding vertical adjustment.

HENRY A. WEILER.